H. H. DOW.
METHOD OF AND APPARATUS FOR EXTRACTING BROMINE.
APPLICATION FILED JUNE 7, 1916. RENEWED AUG. 14, 1920.
1,406,624.
Patented Feb. 14, 1922.
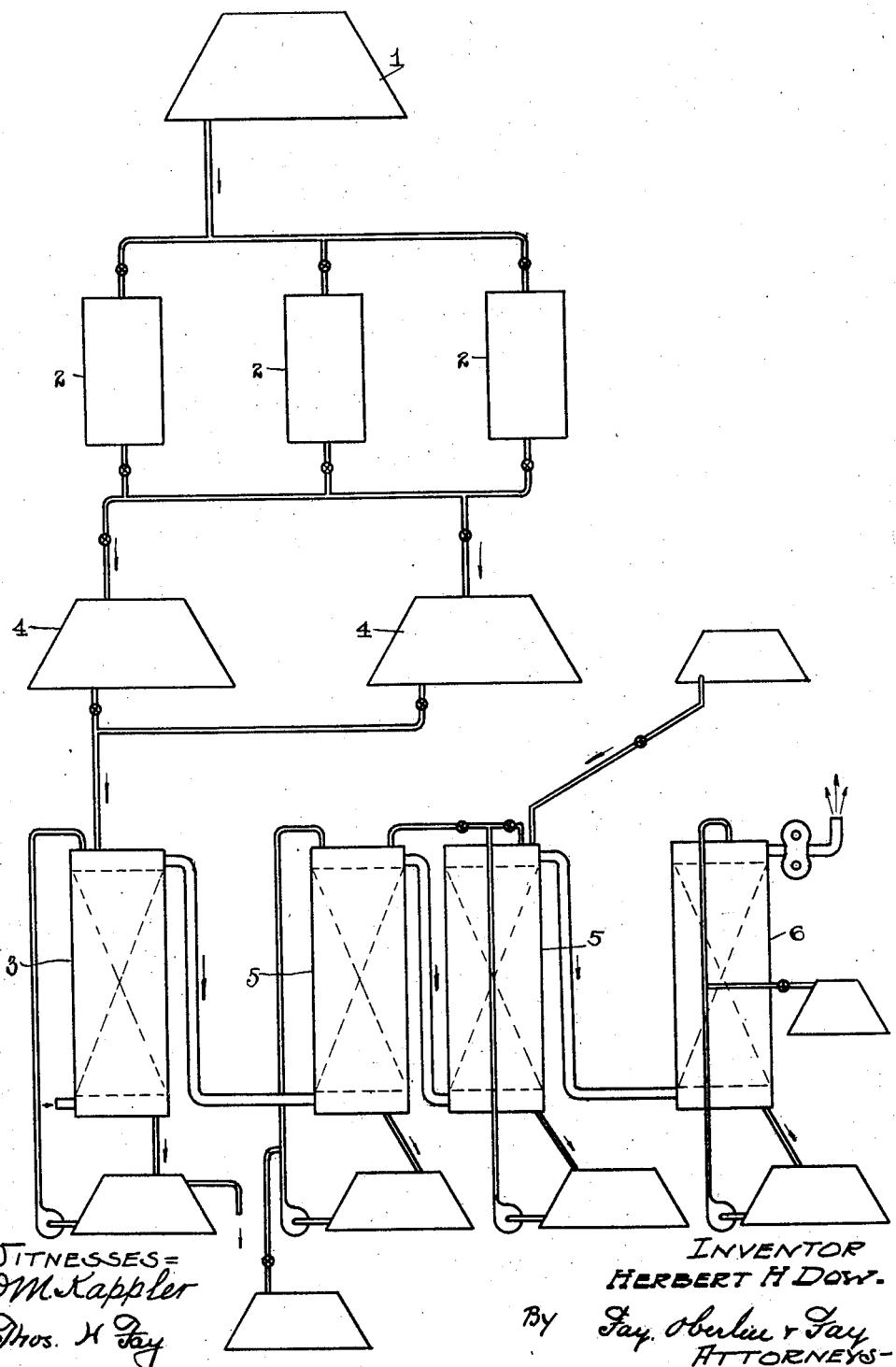

UNITED STATES PATENT OFFICE.

HERBERT H. DOW, OF MIDLAND, MICHIGAN, ASSIGNOR TO THE DOW CHEMICAL COMPANY, OF MIDLAND, MICHIGAN, A CORPORATION OF MICHIGAN.

METHOD OF AND APPARATUS FOR EXTRACTING BROMINE.

1,406,624. Specification of Letters Patent. Patented Feb. 14, 1922.

Application filed June 7, 1916, Serial No. 102,237. Renewed August 14, 1920. Serial No. 403,513.

*To all whom it may concern:*

Be it known that I, HERBERT H. Dow, a citizen of the United States, and a resident of Midland, county of Midland, and State of Michigan, have invented a new and useful Improvement in Methods of and Apparatus for Extracting Bromine, of which the following is a specification, the principle of the invention being herein explained and the best mode in which I have contemplated applying that principle, so as to distinguish it from other inventions.

The present improved process and apparatus for carrying on the same, relate more especially to the extraction of bromine from natural brines, such as those found in the Michigan district, wherein a very small percentage of bromine occurs, along with sodium chloride and other salts. The present process may be regarded as an improvement in the general process described and claimed in U. S. Letters Patent Re. No. 11,232, issued to me April 12, 1892, in which the brine is treated to set the bromine free from its chemical combination, whereupon such bromine goes into solution in the brine, and is freed therefrom by an air blast, being finally absorbed from the air with suitable absorbing material. The treatment of the brine to free the bromine is generally referred to as an oxidation step, and as stated in the patent in question, may be accomplished electrolytically or by the agency of chlorine gas, or by other means.

Where the bromine is thus electrolytically freed, a certain amount of chlorine is of course, simultaneously freed and goes into solution in the brine, even though the electrolytic action be limited so as to oxidize less than the total bromine content. The chlorine thus freed has been, of course, recognized as possessed of oxidizing qualities, and some attempt has been made to utilize the same in preliminarily treating the brine, as in my Patent No. 714,160, dated Nov. 25, 1902.

The object of the present invention is to utilize the oxidizing action of this incidentally freed chlorine on the original brine, so that an amount of bromine may be directly freed corresponding substantially to the current used in the electrolytic step. This desirable result I have found may be accomplished by allowing the electrolized brine to stand for a considerable time, say for example for twenty or more hours, with the result that the chlorine in the solution is thus afforded an opportunity to seek out the highly diffused bromide and displace the bromine, which in turn goes into solution. Accordingly, when the brine is subjected to the air blast, practically no chlorine is left to be blown out, and a yield of bromine is obtained nearly commensurate with the electrolytic energy expended in electrolyzing the original brine.

The invention, then, consists of the steps hereinafter described and fully set forth in the claims, the annexed drawing and the following description setting forth in detail one mode of carrying out the invention, such disclosed mode, however, constituting but one of various ways in which the principle of the invention may be used.

In said annexed drawing, the single figure there appearing represents diagrammatically a form of apparatus suitable for use in carrying out my present improved process.

It will be understood that for the purpose of the present description, the apparatus is shown in its simplest form, eliminating various features, which in practice may be found desirable including certain of those shown as described in my aforesaid Letters Patent No. 714,160.

As illustrated, the apparatus, accordingly, comprises a suitable reservoir 1 for the brine, from which it is shown as being fed directly to one or more suitable electrolytic cells 2, wherein the oxidizing step is carried out as previously described. Instead, however, of conveying the brine after treatment in such oxidizing apparatus directly to the blow-out tower 3, I interpose a chamber or reservoir 4, of considerable size, comparatively, wherein the treated brine flowing from the several electrolytic cells 2 may be collected and retained for a period of hours, preferably upwards of 20 hours, as previously stated.

In order to be able thus to retain the brine for such length of time as may be desired, a pair of such reaction chambers 4, is preferably employed, so that the freshly oxidized brine may flow into one such chamber, while that which has stood in the other for the required interval, may be supplied to the blow-out tower as required.

Following the blow-out tower, the bromine-laden air is conducted through a series of purifying towers 5 of usual construction, and thence through an absorbing tower 6, where the bromine, after being thus purified, is absorbed by a suitable reducing agent, such as iron, with the formation of ferric bromide.

The brine, as it is received in the reaction chambers 4 from the electrolytic cells 2, contains, as previously stated, a certain amount of free chlorine, as well as bromine. This chlorine is given an opportunity to react with the unreduced bromide so that only a relatively small quantity of such chlorine is left in solution, when the brine is finally conducted to the blow-out tower, and at the same time free bromine is produced in an amount corresponding with the electrical energy expended.

Other means of applying the principle of my invention may be employed instead of the one explained, change being made as regards the mechanism and process herein disclosed, providing the means or steps stated by any of the following claims or the equivalent of such stated means or steps be employed.

I therefore particularly point out and distinctly claim as my invention:—

1. In a process of extracting bromine from a brine containing a bromide, the steps which consist in treating such brine to set less than the total amount of bromide free; and then allowing such treated brine to stand, with free chlorine present therein, long enough for such free chlorine to react with the residual bromide.

2. In a process of extracting bromine from a brine containing chloride along with bromide, the steps which consist in treating such brine to set less than the total amount of bromide free, some chlorine being also set free; and then allowing such treated brine to stand long enough for such free chlorine to react with the residual bromide.

3. In a process of extracting bromine from a brine containing chloride along with bromide, the steps which consist in electrolytically treating such brine to set less than the total amount of bromide free, some chlorine being also set free; and then allowing such treated brine to stand long enough for such free chlorine to react with the residual bromide.

4. In apparatus of the character described, the combination with means for treating brine containing chloride along with bromide, whereby chlorine and bromine are liberated; a blow-out tower for blowing out the freed bromine from such treated brine; and a reaction chamber interposed between said means and tower, adapted to receive and hold a quantity of the treated brine, substantially as described.

5. In apparatus of the character described, the combination of an electrolytic cell for treating brine containing chloride along with bromide, whereby chlorine and bromine are liberated; a blow-out tower for blowing out the freed bromine from such treated brine; and a reaction chamber interposed between said cell and tower, adapted to receive and hold a quantity of the treated brine, substantially as described.

6. In apparatus of the character described, the combination of an electrolytic cell for treating brine containing chloride along with bromide, whereby chlorine and bromine are liberated; a blow-out tower for blowing out the freed bromine from such treated brine; and a pair of reaction chambers adapted to be alternatively interposed between said cell and tower, adapted to receive and hold a quantity of the treated brine, substantially as described.

Signed by me, this 3rd day of June, 1916.

HERBERT H. DOW.

Attested by:
CARL E. BARNES,
JNO. F. OBERLIN.